(No Model.)
M. SWENSON.
DEVICE FOR SAMPLING COTTON OR OTHER PRODUCTS.
No. 557,088. Patented Mar. 24, 1896.
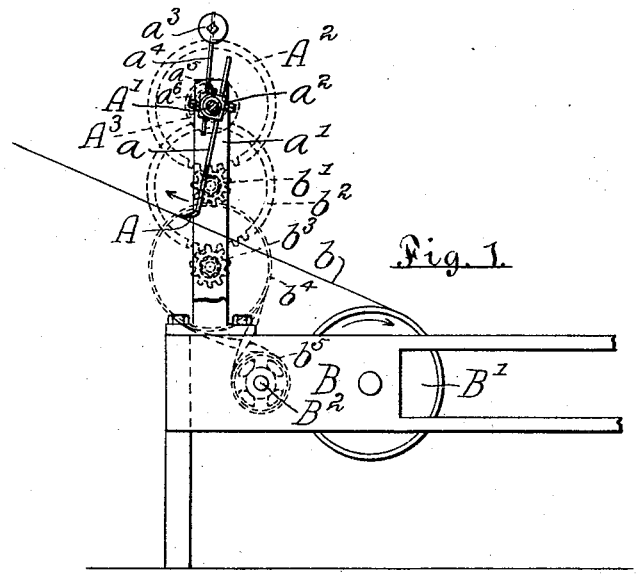
Fig. 1.
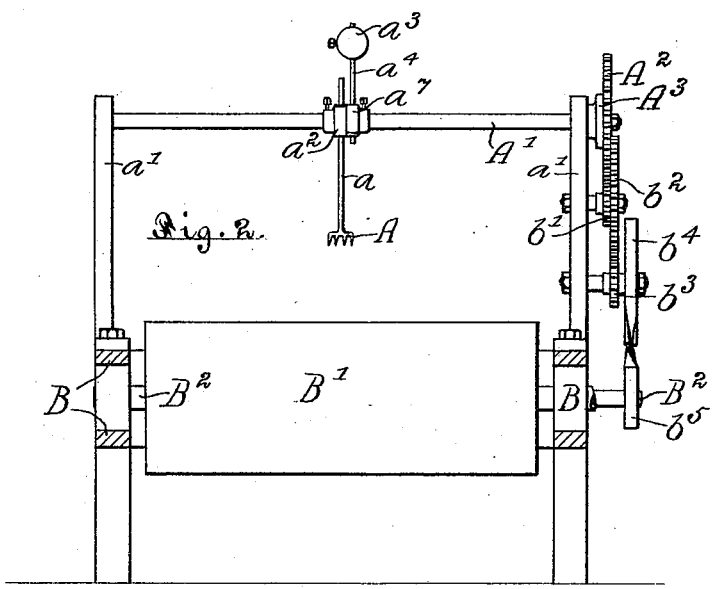
Fig. 2.
Fig. 3.
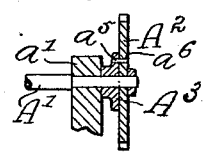
Witnesses.
Inventor.
Magnus Swenson
by Geo. E. Waldo
his Atty.

UNITED STATES PATENT OFFICE.

MAGNUS SWENSON, OF CHICAGO, ILLINOIS.

DEVICE FOR SAMPLING COTTON OR OTHER PRODUCTS.

SPECIFICATION forming part of Letters Patent No. 557,088, dated March 24, 1896.

Application filed October 15, 1895. Serial No. 565,718. (No model.)

*To all whom it may concern:*

Be it known that I, MAGNUS SWENSON, a citizen of the United States, and a resident of Chicago, in the county of Cook and State of Illinois, have invented an Improved Device for Sampling Cotton and other Products, of which the following is a specification.

This invention relates to an improved device for automatically extracting samples from a loose bat of cotton or other fibrous product. Such devices, which may appropriately be termed "samplers" or "sampling devices," are designed for use primarily with cotton-presses, to which the cotton is delivered in the form of a thin bat. By providing means to extract a suitable number of samples from the bat of cotton going to make up each bale and attaching such samples to the finished bale from which they have been taken the quality of the cotton in said bale can readily be ascertained by an examination of such samples without tearing into the bale. The object of my invention is therefore to provide means to automatically extract samples from a bat of cotton or other fibrous product passing through the same at desired intervals.

In the preferable form thereof now known to me a sampling device embodying my invention comprises a pivotally-supported picker or fork, so located relatively to the bat it is designed to sample that at each revolution it will pass through said bat and will remove a quantity of fiber therefrom, means to impart rotary movement to said picker, the connection between said picker and driving mechanism being such as to permit limited movement of said picker independently of said primary driving mechanism, and a secondary actuating mechanism adapted to accelerate the speed of said picker as it passes through said bat.

The invention also consists in the various other features, combinations of features, and details of construction hereinafter described and pointed out in the claims.

In the accompanying drawings a sampling device embodying my invention is fully illustrated.

Figure 1 is a side view of my improved sampling device, showing so much of a rotary cotton-press as will illustrate the application of said sampling device thereto, and the driving mechanism being shown in diagram. Fig. 2 is an end view thereof; and Fig. 3 is a sectional view through the gear on the picker-shaft, showing how said gear is connected to said shaft.

The essential feature of my improved sampling device consists of a hooked fork or picker A, to which rotary movement is imparted about a fixed center and which is so located relatively to the bat which it is designed to sample that at each revolution it will catch in said bat and will extract a quantity of fiber therefrom, which will be retained upon said fork. As shown, said fork or picker is provided with a shank $a$, which is rigidly secured to a shaft $A'$, mounted so as to rotate freely in suitable bearings formed adjacent to the upper ends of upright standards $a'$, which form the frame of my improved sampler.

In the preferable construction the shank $a$ of the picker A, instead of being secured directly to the shaft $A'$, is secured in a hole or bearing formed in a collar $a^2$ on said shaft by a set-screw or other means, so as to be adjustable toward and from its pivotal axis. Preferably, also, the collar $a^2$ is secured upon said shaft by means of a set-screw, thus making provision for angular adjustment of said picker about its pivotal axis. The sampler can thus be readily adapted for use in sampling bats of fiber passing at different distances from its axis of rotation and delivered thereto at different angles.

Rotary movement is imparted to the shaft $A'$ by means of a driving gear or pulley $A^2$ secured thereto. As, however, samples are taken from the bat at comparatively long intervals, the movement of said picker A relatively to the bat will be very slow, which would result in tearing the bat badly and in removing a much larger sample than necessary to properly indicate the quality of said fiber. To obviate this, means are provided to accelerate the movement of said shaft and picker during its passage through the bat. As shown, said means consist of a weight $a^3$ secured to an arm $a^4$ secured to the shaft $A'$, which is sufficiently heavy to impart a rapid rotary movement to said shaft when said shaft is free to rotate under its influence. To allow rotary movement of said shaft and picker under the influence of the weight $a^3$, the gear or pulley $A^2$ is not secured directly to the shaft $A'$, but is connected thereto by means of a pin $a^5$, rigidly secured in a collar $A^3$, secured upon the shaft $A'$, and which is adapted to engage rigid stops formed in or upon the adjacent face of the gear or pulley $A^2$. As shown, the pin $a^5$ engages a segmental circular groove $a^6$, formed in the said face of said gear or pulley concentric with the axis of the shaft $A'$, the ends of which form the stops with which the pin $a^5$ engages, and the length of said slot is such as to allow a desired movement of said shaft relatively to said driving gear or pulley $A^2$. It is obvious that with this construction the shaft $A'$ and the picker $A$ will rotate slowly under the influence of the driving gear or pulley $A^2$ until the weight $a^3$ reaches the highest point of its circular path, that said weight will then descend rapidly, under gravity, until the pin $a^5$ strikes the opposite end of the groove $a^6$, imparting a like rapid movement to the shaft $A'$ and picker $A$, and the adjustment and relation of the various parts is such that such accelerated movement will begin just as the picker $A$ is about to enter the bat of fiber and the length of the groove $a^6$ is such that the accelerated movement will continue until said picker has withdrawn a sample of fiber from said bat and is again free therefrom.

To permit of angular adjustment of the weight $a^3$ about the shaft $A'$ the bar or rod $a^4$ is secured in a collar $a^7$ adjustably secured to said shaft in substantially the same manner as is the picker $A$.

For the purpose of illustrating its application thereto I have, in the drawings, shown my improved sampler in combination with a rotary cotton-press of the type in which the cotton delivered thereto in the form of a thin bat is wound into a cylindrical bale upon a core-roll located between suitable compression-rolls, only so much of a press being shown, however, as is necessary to show the application of my improved sampler thereto.

As shown, B is the frame of the press; $B'$, the stationary compression-roll; $B^2$, the countershaft from which said roll $B'$ is driven, and the line $b$ represents the bat of cotton being delivered thereto.

In the construction shown the standards $a'$ are secured to the frame B of the press, and the shaft $A'$ is driven from the countershaft $B^2$ by means of suitable driving connection therewith. As shown, said driving connection consists of a train of gears $b'\ b^2\ b^3$, pivotally supported on one of the standards $a'$, and of which the gear $b'$ meshes with the gear $A^2$ on the shaft $A'$, and the gear $b^3$ is secured to a pulley $b^4$, driven from a pulley $b^5$, secured to said countershaft $B^2$ by means of a belt $b^6$ adjusted thereto.

The relation of the driving connections is such that the shaft $A'$ will make from three to four revolutions during the formation of each bale, thus taking an equal number of samples therefrom at regular intervals, which will correctly indicate the quality of the cotton contained in said bale.

It is the intention that the samples taken from each bale shall be attached to the finished bale, thus obviating the necessity of tearing into said bale to ascertain the quality of the cotton contained therein.

I claim—

1. In a cotton-sampler, the combination of a pivotally-supported fork or picker, so located, relatively to the bat it is designed to sample, that at each revolution it will catch in said bat and remove a quantity of fiber therefrom, and means to impart rotary movement thereto, substantially as described.

2. In a cotton-sampler, the combination of a pivotally-supported picker, so located, relatively to the bat said device is designed to sample, that at each revolution of said picker it will catch in said bat and remove a quantity of fiber therefrom, means to rotate said picker and means to give an acceleration of speed to said picker, as it passes through said bat, substantially as described.

3. In a cotton-sampler, the combination of a pivotally-supported picker, so located, relatively to the bat it is designed to sample, that at each revolution it will catch in said bat and remove a quantity of fiber therefrom, means to impart a normally-slow rotary movement to said picker and means to accelerate the movement of said picker and cause it to pass rapidly through said bat, substantially as described.

4. In a device for sampling cotton and other similar products, the combination of a pivotally-supported fork or picker, so located, relatively to the bat it is designed to sample, that, at each revolution, it will catch in said bat and remove a quantity of fiber therefrom, means to impart rotary movement to said picker, said driving mechanism comprising a driven gear or pulley and a crank or disk in rigid communication with said picker, said gear or pulley and disk or crank being connected by means of a rigid pin in one adapted to engage rigid stops on the other, so as to allow limited movement of the picker relatively to the driving-gear or pulley and a weight applied to said picker so as to rotate the same independently of said driving-gear or primary driving mechanism, substantially as described.

In testimony that I claim the foregoing as my invention I hereunto set my hand this 6th day of September, 1895.

MAGNUS SWENSON.

Witnesses:
F. C. CALLENDEN,
BYRON B. CARTER.